UNITED STATES PATENT OFFICE.

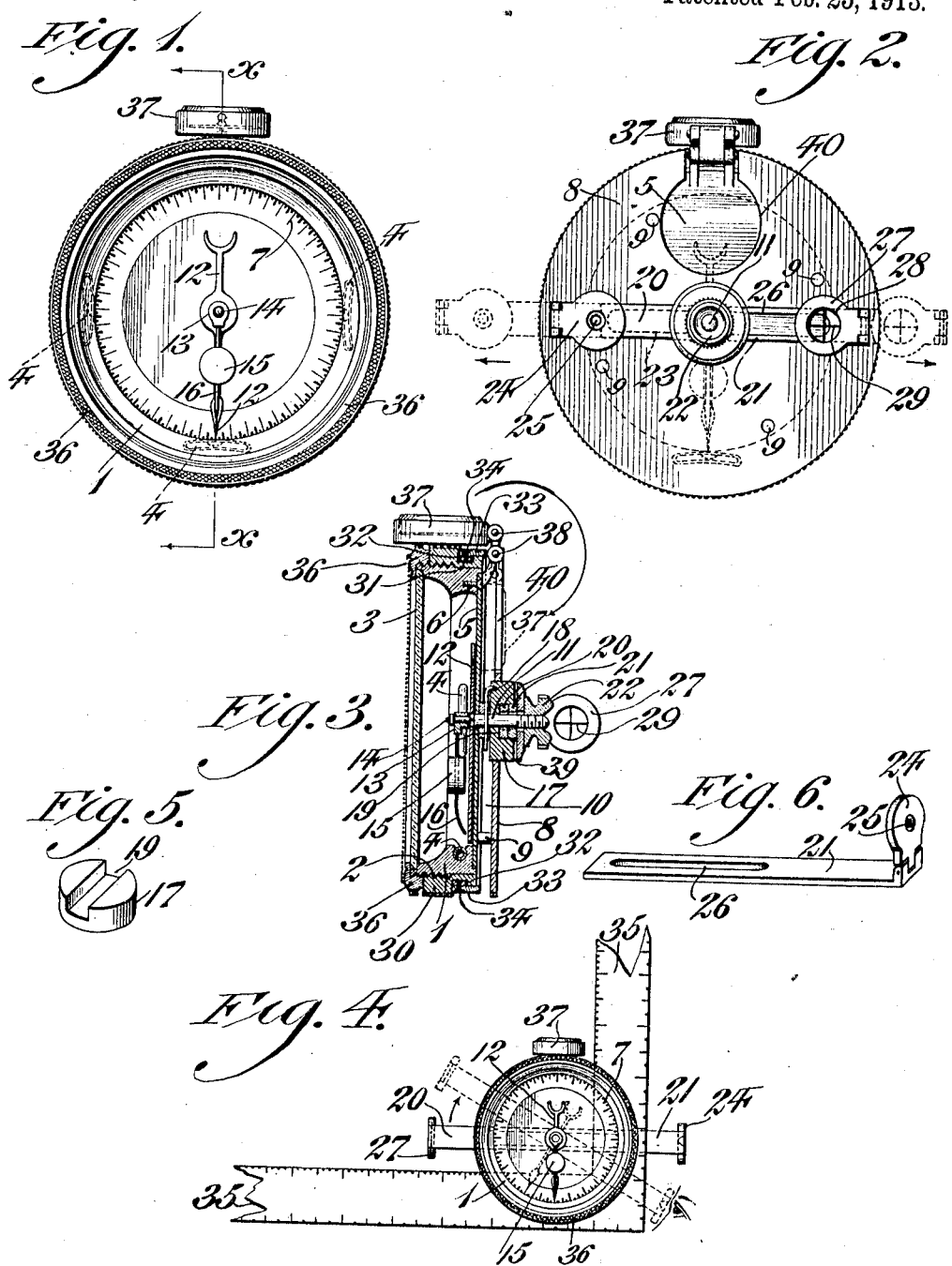

LEWIS W. MERKEL, OF ALLENTOWN, PENNSYLVANIA, ASSIGNOR OF ONE-FOURTH TO JOSEPH FLAMISCH, OF ALLENTOWN, PENNSYLVANIA.

MEASURING APPARATUS.

1,054,304.

Specification of Letters Patent.   Patented Feb. 25, 1913.

Application filed April 19, 1912.   Serial No. 691,840.

*To all whom it may concern:*

Be it known that I, LEWIS W. MERKEL, a citizen of the United States, residing at Allentown, Lehigh county, State of Pennsylvania, have invented a new and useful Measuring Apparatus, of which the following is a specification.

This invention relates to leveling instruments and more particularly to a pocket or portable type of instrument and has for an object to provide an instrument which indicates horizontal levels and angles of inclination whereby heights of buildings, building structures, trees or the like may readily be determined and all operations where angular distance or inclination of surface is desired.

It has for a further object to provide an instrument of the character stated which may be quickly attached to a square or like tool and used in connection therewith for the purposes of leveling, giving lines and levels for buildings, laying out angles and grading streets, sewers, drains, or the like, and locating and positioning of fire escapes or ladders to be attached to buildings.

It further consists of other novel features of construction, all as will be hereinafter fully set forth.

For the purpose of illustrating my invention, I have shown in the accompanying drawing one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a front elevation of an instrument embodying my invention. Fig. 2 represents a rear elevation of the same. Fig. 3 represents a section on line x—x of Fig. 1. Fig 4 represents my novel instrument as applied to a square for use in leveling. Fig. 5 represents a detail of construction. Fig. 6 represents a perspective of one of the sight members.

Similar numerals of reference indicate corresponding parts in the figures.

Referring to the drawings, 1 designates an annular body portion having an outer circumferential threaded surface 2 by means of which certain adjuncts of the instrument are secured thereto and also having a glass or like transparent cover 3, for the purpose of permitting observation of the interior of the body portion 1.

4 designates a plurality of level bubbles suitably mounted within the walls of the body portion 1 and arranged at suitable spaced intervals, in the present instance, ninety degrees, and of course positioned so that they may readily be seen through the cover 3.

5 designates a plate preferably seated in a cut away portion of the body 1 and secured thereto by means of screws 6 or like fastening devices, whereby a back or bottom wall is provided upon which circumferentially arranged lines 7 are cut and properly spaced to divide the said plate into degrees to accurately indicate various angles in the use of the instrument. To this plate 5, I preferably secure, in a fixed manner, a rear disk 8 the attaching means consisting as here shown of a plurality of rivets or posts 9 which serve to maintain a predetermined or definite space 10 between the plate 5 and the said disk 8, the purpose of which will later be made clear.

11 designates a stud preferably centrally disposed with respect to the plate 5 and disk 8 and passing transversely through the same so as to project on one side into the annular body 1 and on the other side extend a suitable distance to permit certain operating adjuncts to be connected thereto, as will be apparent. This stud 11 is mounted so that it may be rotated if desired and carries a pointer or arrow 12 adapted to move therewith and having one end juxtaposed with respect to the degree lines 7 so that correct readings of the angles may be made.

13 designates a bushing or hub loosely mounted, in the present instance, on a pin 14 secured to the stud 11 and axially arranged with respect thereto, the said bushing forming a support for a movable weight or plumb-bob 15 which in turn carries an indicating finger 16 positioned in operative relation to the degree lines 7. It will thus be apparent that when the instrument is held in a substantially vertical position the plumb-bob 15 will accurately adjust itself to indicate the vertical axis of the device.

17 designates a block mounted upon the stud 11 and fixed thereto by means of a pin 18, key or equivalent device, whereby rotary movement of the said block turns the stud 11 and causes the pointer 12 to move as desired. The block 17, as here shown, is provided with a transverse slot 19 forming a guide way and seat for a pair of arms 20 and 21, the combined thickness of which is preferably greater than the depth of the slot 19 in order that a locking plate 39 may contact therewith and hold the same in any desired fixed position by means of the thumb nut 22, threaded on the end of the stud 11.

The arm 20 is provided with an elongated slot 23 through which the stud 11 passes in order to permit longitudinal adjustment of the arm with respect to the instrument, while hinged to the said arm in any desired manner is an eye piece 24 having a sight opening 25 therethrough. The arm 21 is a substantial duplicate of the arm 20 in that it is provided with an elongated opening 26 but instead of an eye piece it has a hinged object disk 27 having an opening 28 therein, within which are mounted the usual object cross hairs 29. It will thus be apparent that by raising the two pieces 24 and 27 leveling sights are provided which may be used for accurately locating a distant point and determining through the degree lines 7 the angular inclination of the said point.

30 designates a casing adapted for screw threaded engagement with the threads 2 of the body 1 and having a circumferential groove 31 formed therein adapted to receive an annulus 32 which is loosely mounted therein and may readily be turned with respect to the casing 30. To this annulus 32 a clamping ring 33 is secured by screws or the like 34 which ring preferably projects beyond the plate 5 and forms with the disk 9 a clamping device for engaging a square 35, or like tool in order to fixedly secure the instrument thereto, the clamping action taking place as will readily be seen by turning the casing 30 about the body portion 1.

36 designates a cap ring adapted for threaded engagement with the threads 2 and which in assembled condition firmly holds the observation cover 3 in position.

37 designates a compass suitably pivoted in ears 38 to the disk 8, whereby it is supported in such a manner that it may be swung from inoperative to operative position. When not in use this compass is swung back and seats in an opening 40 in the disk 8 whereby it is substantially flush therewith and not in the way.

In the operation of the instrument it is possible to establish a desired level by the use of the bubbles from which the heights or inclinations of certain objects or structures may be determined by swinging the arms 20 and 21 into line with the object and obtaining the required reading on the degree scale by the use of the eye and object pieces and the arrow 12 which moves with the said arms. The clamping device forms an effective means for securing the instrument in operative position on a square or other support and thereby completes a simple and efficient portable leveling instrument.

It will now be apparent that I have devised a novel and useful construction of a measuring apparatus which embodies the features of advantage enumerated as desirable in the statement of the invention and the above description, and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a device of the character stated, a leveling instrument comprising an annular body portion, a plate secured thereto forming a back, a transparent cover for said body portion, a degree scale circumferentially arranged on said plate, an indicator movably mounted on said plate and adjacent said degree scale, sighting means carried by said instrument, a plurality of level bubbles visibly mounted in said body portion, a disk fixedly carried by said plate and spaced therefrom, and means to clamp a suitable support to said disk.

2. In a device of the character stated, a leveling instrument comprising an annular body portion, a plate secured thereto forming a back, a transparent cover for said body portion, a degree scale circumferentially arranged on said plate, an indicator movably mounted on said plate and adjacent said degree scale, sighting means carried by said instrument, a plurality of level bubbles visibly mounted in said body portion, a disk fixedly carried by said plate and spaced therefrom, a clamping ring, and means coöperating with said body portion to move said ring to clamp a suitable support against said disk.

LEWIS W. MERKEL.

Witnesses:
GEORGE E. BOYLE,
JOHN J. HANLON.